United States Patent [19]
Choate et al.

[11] Patent Number: 5,647,015
[45] Date of Patent: Jul. 8, 1997

[54] METHOD OF INFERRING SENSOR ATTITUDE THROUGH MULTI-FEATURE TRACKING

[75] Inventors: William Clay Choate, Dallas; Rajendra K. Talluri, Austin, both of Tex.

[73] Assignee: Texas Instruments Incorporated, Dallas, Tex.

[21] Appl. No.: 487,204

[22] Filed: Jun. 7, 1995

Related U.S. Application Data

[63] Continuation of Ser. No. 808,252, Dec. 11, 1991.

[51] Int. Cl.$^6$ .................................................. G06K 9/20
[52] U.S. Cl. .......................... 382/103; 382/278; 364/455
[58] Field of Search ....................................... 382/103, 278; 348/113, 117, 169; 364/449, 453, 455; 244/3.15, 3.17, 3.18, 3.21

[56] References Cited

U.S. PATENT DOCUMENTS

| | | | |
|---|---|---|---|
| 4,162,775 | 7/1979 | Voles | 244/3.17 |
| 4,324,491 | 4/1982 | Hueber | 356/152 |
| 4,688,092 | 8/1987 | Kamel et al. | 358/109 |
| 4,746,976 | 5/1988 | Kamel et al. | 358/103 |
| 4,969,036 | 11/1990 | Bhanu et al. | 358/105 |
| 4,993,662 | 2/1991 | Barnes et al. | 244/3.17 |
| 5,155,684 | 10/1992 | Burke et al. | 364/424.02 |
| 5,204,818 | 4/1993 | Landecker et al. | 364/459 |

OTHER PUBLICATIONS

S. Singh et al, "Nonlinear Decoupling Sliding Mode Control and Attitude Control of Spacecraft." Sep. 1989 pp. 621–633.

*Primary Examiner*—Leo Boudreau
*Assistant Examiner*—Chris Kelley
*Attorney, Agent, or Firm*—Robert L. Troike; Leo N. Heiting; Richard L. Donaldson

[57] ABSTRACT

A method for inferring precise sensor attitude information in a tracking sensor system begins with storing at a first time a reference image in a memory associated with tracking sensor. Next, the method includes sensing at a second time a second image. The sensed image comprises a plurality of sensed feature locations. The method further includes determining the position of the tracking sensor at the second time relative to its position at the first time and then forming a correlation between the sensed feature locations and the predetermined feature locations as a function of the relative position. The method results in an estimation of a tracking sensor pose that is calculated as a function of the correlation. Because the method is primarily computational, implementation requires no new hardware in a tracking sensor system other than that which may be required to provide additional computational capacity.

5 Claims, 2 Drawing Sheets

METHOD OF INFERRING SENSOR ATTITUDE THROUGH MULTI-FEATURE TRACKING

This is a continuation of application Ser. No. 07/808,252, filed Dec. 11, 1991.

TECHNICAL FIELD OF THE INVENTION

The present invention relates to control of electromagnetic and other types of sensor systems and, more particularly, describes a method of inferring sensor attitude through multi-feature tracking using position determination systems such as Inertial Navigation Systems (INS) together with imaging sensors such as Forward Looking Infrared (FLIR) and radio frequency (RF) emitter sensor systems.

BACKGROUND OF THE INVENTION

Accurate determinations of sensor pose (i.e., sensor position and attitude) provide essential information for passive ranging methods in sensor systems using this type of range measurement technique. Passive ranging has important practical applications in covert terrain-following and terrain-avoidance methods and in certain missile systems uses. For example, sensors that track objects and images, such as those sensors that fire-and-forget missiles possess, require accurate estimates of sensor pose during target intercept and other operations where the missile sensor moves relative to a tracked object.

To determine the sensor pose, it is necessary to accurately determine the sensor attitude. Attitude determination, however, is an ill-conditioned problem. Most tracking sensors employ image correlation and comparison methods based on local statical distributions of pixel intensity for attitude determinations. For example, adaptive gate centroid trackers use a template to correlate images that the sensor systems keeps as a "reference" in memory for this purpose.

These and other methods for accurately determining sensor pose are important for passive ranging algorithms. Passive ranging algorithms, however, are sensitive to errors that exist during range calculations. Errors in passive range cacluations are in large part the result of two factors. The first factor is small errors that exist in correlating the sensed image to the reference image in the memory. The second factor is small error resulting from a decoupling that occurs between the sensor and the navigation system (e.g., an INS system) as the aircraft structure or platform containing the sensor flexes or changes shape.

Present sensor systems that perform passive ranging do not address the ill-conditioning that exists in the attitude determination problem. Thus, there is a need for a method that provides accurate attitude determination for the purpose of calculating sensor pose during passive ranging.

There is a need for a method to determine sensor attitude that overcomes the decoupling between the sensor and the navigation system that occurs as a result of aircraft or platform flexture.

Moreover, there is a need for a method and system that minimizes the effect of calculation errors that may exist during the correlation of a template or other reference in memory to the sensed image that the sensor detects.

SUMMARY OF THE INVENTION

The present invention, accordingly, provides a method of inferring sensor attitude during multi-feature tracking that overcomes or reduces disadvantages and limitations associated with prior methods for determining sensor attitude. The method and system improve the sensor pose determinations to enhance passive ranging methods for a variety of sensor systems.

One aspect of the present invention is a method for compensating a sensor pose that comprises the steps of computing from the tracker locations of multiple features of an image. The sensor pose compensation has use in passive ranging where it is difficult to measure attitude to any acceptable precision.

The steps of the method of the present invention include loading at a first time in the sensor tracker system a correlation template, statistical approximation or other reference for the image that includes one or more features for the sensor to detect. Then, at a second later time after the sensor moves the method entails relocating the features in the sensed image as sensed feature locations. Then, the method compares the sensed feature locations to the stored reference feature locations. Using the correlation between the sensed feature locations and the reference feature locations, the method of the present invention entails using the sensor tracker to determine the sensor pose. This process is continued iteratively to determine the best estimate of the sensor pose. This best estimate improves the passive ranging calculations of the sensor.

A technical advantage of the present invention is that it provides a method to improve the accuracy of passive range estimation procedures in tracking sensor systems.

Another technical advantage of the present invention is that it provides an accurate method of inferring the sensor attitude when the sensor translational motion is known and the sensor is tracking multiple features.

The present invention has application in missiles and other platforms that use information from the inertial navigation systems (INS) for input to sensor systems such as Forward Looking Infrared (FLIR) and air-to-ground radio frequency (RF) emitter locating sensors.

BRIEF DESCRIPTION OF THE DRAWINGS

The invention and its modes of use and advantages are best understood by reference to the following description of illustrative embodiments when read in conjunction with the accompanying drawings, wherein.

DETAILED DESCRIPTION OF THE INVENTION

The preferred embodiment is best understood by referring to the FIGUREs wherein like numerals and symbols and used for like and corresponding references to the various drawings.

The method of the preferred embodiment permits determining the attitude (yaw, pitch and roll) of an imaging sensor relative to its attitude at a reference time. Inputs are images at a first time and a second time and relative sensor position. The relative sensor position may be provided by an inertial navigation system (INS) or other source. The method meets the needs of passive ranging methods and systems where accurate estimates of attitude are crucial to the missile or platform performance and are difficult to obtain, particularly when the sensor and INS are not co-located. For many of these systems, however, it is not difficult to obtain estimates of relative translational motion to the required accuracy.

The preferred embodiment is best understood when considering an example in which certain assumptions hold. The first assumption is that the sensor is in or on an aircraft, such as a missile, flying over terrain. The example also assumes that image features are automatically evaluated or selected for robust tracking and that image trackers continually relocate features within the field-of-view (FOV). Furthermore, the example assumes that new features are introduced to replace those lost through motion. Finally, the example uses an assumption that features derive from stationary objects in the scene. With these assumptions, the explanation of the preferred embodiment proceeds as follows.

Feature locations are reported by the trackers as points in the image, although the features themselves are distributed objects. Interpolation techniques can provide sub-pixel resolution, but the example of the preferred embodiment assumes tracker outputs are reported as pixel locations.

Figure 1:
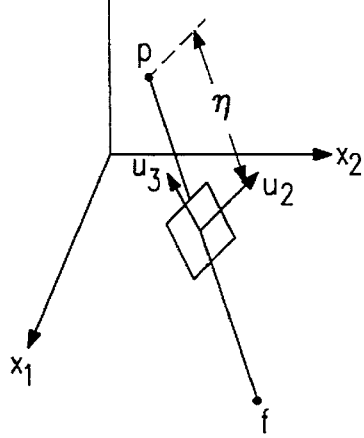
FIG. 1 illustrates the world coordinate system that pertains to the reference and sensed images.
Figure 2:
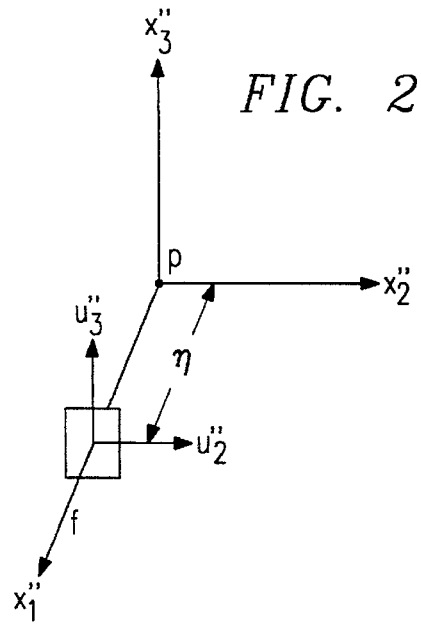
FIG. 2 provides a conceptual illustration of a conical coordinate system applicable to the preferred embodiment.

The image of the tracking sensor typically is in a world coordinate system, as depicted in FIG. 1. Understanding the preferred embodiment becomes simple, however, in a canonical coordinate system that is obtainable by transforming world coordinates. FIG. 2 shows such a canonical coordinate system.

In FIG. 1, the center-of-focus (COF) is located at point p. A line from p to the fixation point f passes through the center of the imaging array and is normal to it. This determines the direction of the unit normal to the array, denoted n. The center of the imaging array is located at p+ηn, where η is the focal length. Positions within the imaging plane are defined by the 2-dimensional coordinate system ($u_2$, $u_3$), where from the perspective of the observer, $u_2$ is associated with horizontal and $u_3$, with vertical.

The canonical coordinate system of FIG. 2 may be obtained by a translation and rotation of the world coordinate system of FIG. 1. This transformation leaves invariant distances such as focal length. Note that FIGS. 1 and 2 employ similar nomenclature, with primes distinguishing quantities in the canonical system. In FIG. 2, the COF is at the origin and the fixation point is on the $x_1$ axis at $x_1''=|f-p|$. Axes $u_2''-u_3''$ are offset from, but aligned with, $x_2''-x_3''$.

The transformation from world to canonical coordinates consists of certain simple steps. The first step is to translate the origin to p. The system is then rotated by a yaw angle $\phi_3$ about the $x_3$-axis so that the fixation point is directly below the $x_1'$-axis in the resulting intermediate coordinate system $x_1'-x_2'-x_3$. Next, the system is rotated by pitch angle $\phi_2$ about the $x_2'$-axis so that the fixation point falls on the $x_1''$-axis in the resulting intermediate coordinate system $x_1''-x_2'-x_3$. The system is then rotated by a roll angle $\phi_1$ about the $x_1''$-axis so that the positive $u_2''$-axis aligns with the positive $x_2''$-axis of the resulting final coordinate system $x_1''-x_2''-x_3''$.

These translational processes are representable by the matrix-vector equation:

$$x''=S(x-p) \tag{1}$$

where 3-vectors x and x'' are locations in world and canonical coordinates, respectively. If x represents the location of a feature, it is by assumption, constant. However, its mapping into canonical coordinates, x'', is time-varying due to sensor motion. The 3-by-3 rotation matrix S is given by:

$$S = \begin{bmatrix} 1 & 0 & 0 \\ 0 & c_1 & s_1 \\ 0 & -s_1 & c_1 \end{bmatrix} \begin{bmatrix} c_2 & 0 & -s_2 \\ 0 & 1 & 0 \\ s_2 & 0 & c_2 \end{bmatrix} \begin{bmatrix} c_3 & s_3 & 0 \\ -s_3 & c_3 & 0 \\ 0 & 0 & 1 \end{bmatrix}. \tag{2}$$

where $c_i=\cos \phi_i$ and $s_i=\sin \phi_i$. An important property of S is orthonormality, that is $$S^{-1}=S^T, \tag{3}$$

where $S^T$ denotes the matrix transpose of S. This property makes it easy to transform between reference frames.

The Euler angles $\phi_2$ and $\phi_3$ may be related to the unit normal n in world coordinates using the special case of 1:

$$\begin{pmatrix} 1 \\ 0 \\ 0 \end{pmatrix} = Sn \tag{4}$$

To solve this, transpose and multiply on the right by S. From this expression, identify:

$$c_2 = \sigma \tag{5}$$

$$s_2 = -n_3 \tag{6}$$

$$c_3 = n_1/\sigma \tag{7}$$

$$s_3 = n_2/\sigma \tag{8}$$

where $$\sigma = \sqrt{n_1^2 + n_2^2} . \tag{9}$$

These results are useful when $\theta_1$ and n are used to specify attitude.

Figure 3:
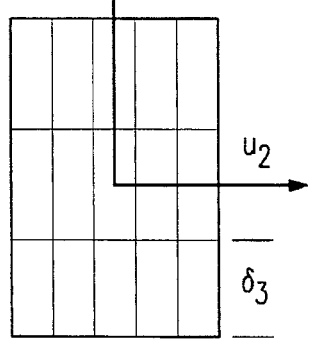
FIGS. 3 and 4 illustrate pixel arrays applicable to the preferred embodiment.
Figure 4:
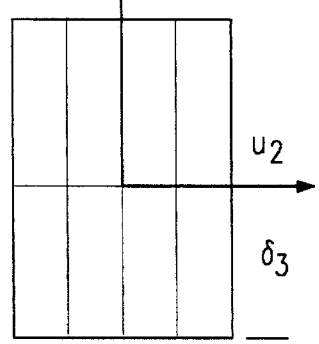

The tracking sensor system assigns to each feature within the FOV a pixel location in the imaging array. This mapping is independent of choice of coordinate system. The physical center of this pixel is taken as the location ($u_2''$, $u_3''$) of the feature in the image plane. It is appropriate to assume the imaging array is rectangular with $N_r$ rows and $N_c$ columns. Pixels are identified by 2-tuples of the form (j,i) where j is the column index and i is the row index. The remaining details of this mapping are contained in $$u_2'' = \left[ j - \frac{N_c-1}{2} \right] \delta_2; j \in [0,(N_c-1)] \tag{10}$$

and $$u_3'' = \left[ i - \frac{N_r-1}{2} \right] \delta_3; i \in [0,(N_r-1)] \tag{11}$$

where $\delta_2$ is the column spacing and $\delta_3$ is the row spacing. FIGS. 3 and 4 are illustrations of very simple imaging arrays.

Figure 5:
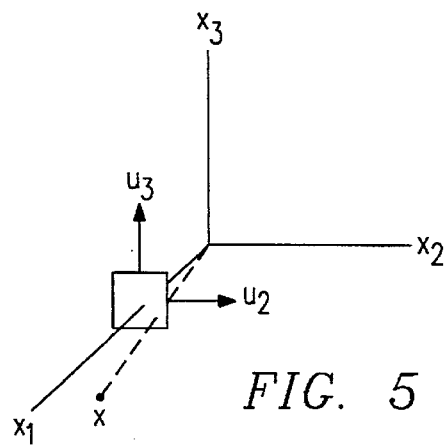
FIG. 5 illustrates the geometry of image formation of the preferred embodiments.

Referring now to FIG. 5, by similar triangles:

$$\frac{u_2''}{\eta} = \frac{x_2''}{x_1''} \tag{12}$$

$$\frac{u_3''}{\eta} = \frac{x_3''}{x_1''} \tag{13}$$

Note that ($\eta$, $u_2''$, $u_3''$) and ($x_1''$, $x_2''$, $x_3''$) may have different units of measure provided each system is self-consistent. As an expedient, we take $\eta$ as the unit of measure in the image plane, such that $$u'' = \begin{pmatrix} 1 \\ u_2'' \\ u_3'' \end{pmatrix} \quad (14)$$

If $u''$ in Equation (14) is the mapping of $x''$ in object space, by Equations (12) and (13)

$$x_1'' = x'' \quad (15)$$

The effect of motion on images collected at two times, 0 and 1 (in appropriate units) is an important parameter of the preferred embodiment. The derivation is simplified by picking the coordinate system to coincide with canonical coordinates at time 0, yielding $$x''(0) = x \quad (16)$$

Using Equations (1) and (15), at time 1 the following holds:

$$x_1''(1) u''(1) = S(1) [x - p(1)]. \quad (17)$$

The first row of Equation (17) defines $x_1''(1)$ and may be used to eliminate it in the second and third rows, with the result $$[u_2''(1) s_1(1) - s_2(1)]^T [x - p(1)] = 0 \quad (18)$$

$$[u_3''(1) s_1(1) - s_3(1)]^T [x - p(1)] = 0, \quad (19)$$

where $s_i^T(1)$ denotes the $i^{th}$ row of $S(1)$. Substituting from Equations (15) and (16) for $x$, $$[u_2''(1) s_1(1) - s_2(1)]^T [x_1 u(0) - p(1)] = 0 \quad (20)$$

$$[u_3''(1) s_1(1) - s_3(1)]^T [x_1 u(0) - p(1)] = 0. \quad (21)$$

Evaluating the inner products, obtain $$x_1 u_2''(1) g_{11} - g_{21}] - u_2''(1) g_{12} + g_{22} = 0 \quad (22)$$

$$x_1 [u_3''(1) g_{11} - g_{31}] - u_3''(1) g_{12} + g_{32} = 0 \quad (23)$$

where the $g_{ij}$ are elements of the 3-by-2 matrix $$G = [g_{ij}] = S(1) [u(0) | p(1)] \quad (24)$$

By eliminating $x_1$ between Equations (22) and (23) and simplifying, $$\begin{vmatrix} 1 & g_{11} & g_{12} \\ u_2 & g_{21} & g_{22} \\ u_3 & g_{31} & g_{32} \end{vmatrix} = 0 \quad (25)$$

where $u_2$ and $u_3$ are shorthand for $u_2''(1)$ and $u_3''(1)$, respectively. Hence, the determinant in Equation (25) vanishes when motion parameters $p(1), \phi_1(1), \phi_2(1)$ and $\phi_3(1)$ are consistent with the observed feature locations $u(0)$ and $u(1)$. However, the solution of Equation (25) is underdetermined, since there are three unknowns. This is overcome by adjoining equations for other features. Adopting a least squares approach, it is practical to define the nonnegative cost function for K features ($K \geq 3$) as $$J = \sum_{k=1}^{K} \Delta_k^2 \quad (26)$$

where $\Delta_k$ is the determinant for feature k. The method of the preferred embodiment, thus, is to determine the Euler angles which minimize the cost function J.

The problem of minimizing Equation (26), however, is nonlinear and must be solved iteratively. Newton's method or other gradient-based approaches can be applied as analytical expressions for the derivatives can be derived. However, efficient procedures are available that avoid the need for differentiation, for example, Powell's method as described in M. J. D. Powell, "An Efficient Method of Finding the Minimum of a Function of Several Variables Without Calculating Derivatives," *The Computer Journal*, 7, 155–162, 1964, and G. R. Walsh, *Methods of Optimization*, John Wiley and Sons, 1975, pp. 129–138, provides an applicable optimization technique. An illustrative embodiment uses a two-stage search that the following discussion describes.

Testing of the preferred embodiment has been performed with synthetic data. The minimum of the cost function J was sought by searching the three-dimensional solution space about a nominal set of Euler angles, such as might be provided by an INS. Experiments were repeated for several levels of measurement noise.

The resolution and FOV of the sensor will affect performance. The sensor model of the tests assumed an array of 480 rows and 960 columns of light sensitive elements or pixels. Each pixel is square and subtends an angle of 0.1 milliradian. This corresponds to a pixel dimension of 10 microns and a focal length of 10 centimeters, for example. The horizontal FOV is 96 milliradians or 5.5 degrees. The narrow FOV makes it difficult to maintain a feature within the FOV for long.

The pose of the sensor at times 0 and 1 also affects performance. The locations of the COF at times 0 and 1 were chosen as follows:

$$p(0) = \begin{pmatrix} 0 \\ 0 \\ 2000 \end{pmatrix} \quad (27)$$

$$p(1) = \begin{pmatrix} 500 \\ 100 \\ 2200 \end{pmatrix} \quad (28)$$

Attitude was specified as a roll angle $\phi_1$ and the normal n to the imaging array. At time 0, roll was assumed to be 2.5 degrees and the normal, $$n(0) = \begin{pmatrix} 0.2 \\ 0.4 \\ 0.8944 \end{pmatrix}. \quad (29)$$

At time 1, roll was assumed to be 5.0 degrees. The normal was not specified directly, but was computed by requiring that the fixation point be identical to that at time 0. In this calculation, fixation points were defined at zero attitude. Computing n(1) in this manner increases the probability that a feature will be visible at both locations.

A contributor to measurement error is quantization of ($u_2''$, $u_3''$) to the discrete pixel location (j,i). While sub-pixel interpolation may reduce this error, the tests of the preferred embodiment do not model sub-pixel interpolation. To model other tracker errors, Gaussian white noise was added to the feature locations before quantization. The noise had zero mean. The variance was experimentally controlled.

Feature locations in the imaging array at time 0 were picked stochasticly using a Gaussian random number generator. The nature of the distribution caused feature candidates to cluster near the center of the array. A ray from the COF was struck through the center of the pixel and projected until it reached an attitude h, another random variable which modeled the topography of the terrain. This point was then back-projected to the COF at time 2 and the intersection with the imaging plane noted. The location of the intersection was corrupted with noise and quantized to a pixel location. If the location was within the FOV, the feature was accepted. If not, it was discarded and a new candidate was processed. Candidates were processed until eight features had been defined.

Since the coordinate system at time 0 is not canonical, the derivations of the preceding section must be modified. Fortunately, it is only necessary to replace $S(1)$ with $S(1) S^T(0)$ and $p(1)$ with $S(0)[p(1)-p(0)]$.

TABLE 1

Results (deg) with resolution = 1.0 deg.

| Euler Angle | | RMS Noise (pixels) | | |
|---|---|---|---|---|
| | | 0.2680 | 0.6867 | 1.7340 |
| Roll | True | 5.00 | 5.00 | 5.00 |
| | Estimated | 4.10 | 4.20 | 4.40 |
| | Scatter | 0.46 | 0.60 | 0.60 |
| Pitch | True | 70.10 | 70.10 | 70.10 |
| | Estimated | 70.00 | 70.00 | 70.00 |
| | Scatter | 0.04 | 0.04 | 0.05 |
| Yaw | True | 93.80 | 93.80 | 93.80 |
| | Estimated | 92.50 | 92.60 | 92.60 |
| | Scatter | 0.47 | 0.42 | 0.46 |

A two-stage search was employed to seek the minimum value of the cost function J. Resolution of the first stage was specified interactively and was either 1.0 degree or 0.1 degree. This is the resolution referred to in the titles of the Tables 1 through 4, herein. The second stage resolution was 10 times the first stage resolution, i.e., 0.1 degree and 0.01 degree, respectively. The range searched was ±5 resolution elements about a nominal. To allow for possible entrapment at local minima, the Euler angles associated with the 15 lowest values of J were stored and used as nominal values in the second stage. Results of the second stage searches were sorted to extract the five results with the smallest value of J. The medians of the Euler angles in this group were taken as the estimates. As a measure of confidence, the RMS deviation of the individual estimates from the median was computed. Table 1 lists these measurements as the "scatter."

Table 1 summarizes the results obtained with a first stage resolution of 1.0 degree. Note that good estimates of pitch are obtained throughout, while roll and yaw have slightly lower correlations with their true values. The scatter is a good qualitative indicator of accuracy. Table 2 gives values of the cost function J for the true Euler angles and those yielding the minimum value of J. For the lowest level of measurement noise, the true Euler angles yielded a smaller value for J that the minimizing values. This indicates that the search did not uncover the neighborhood of the true minimum. To see if this could be corrected by increasing the resolution of the search, resolution was increased by 10 and the experiment was then repeated. The results are shown in Table 3. Note that errors in roll and yaw are greatly diminished. Additionally, the low scatter suggests reliable estimates. Values of the cost function of this search are given in Table 4. As expected, values for the minimizing Euler angle are smaller, especially the one for the lowest measurement noise.

TABLE 2

$J(10^6)$ with resolution = 1.0 deg.

| Euler Angles | RMS Noise (pixels) | | |
|---|---|---|---|
| | 0.2680 | 0.6867 | 1.7340 |
| True | 1.4363 | 4.2261 | 7.3928 |
| Minimizing | 2.3221 | 3.6228 | 4.5824 |

TABLE 3

Results (deg) with resolution = 1.0 deg.

| Euler Angle | | RMS Noise (pixels) | | |
|---|---|---|---|---|
| | | 0.2680 | 0.6867 | 1.7340 |
| Roll | True | 5.00 | 5.00 | 5.00 |
| | Estimated | 4.96 | 4.86 | 5.25 |
| | Scatter | 0.04 | 0.06 | 0.05 |
| Pitch | True | 70.10 | 70.10 | 70.10 |
| | Estimated | 70.10 | 70.10 | 70.10 |
| | Scatter | 0.00 | 0.00 | 0.00 |
| Yaw | True | 93.80 | 93.80 | 93.80 |
| | Estimated | 93.75 | 93.75 | 93.75 |
| | Scatter | 0.01 | 0.03 | 0.01 |

TABLE 4

$J(10^6)$ with resolution = 1.0 deg.

| Euler Angles | RMS Noise (pixels) | | |
|---|---|---|---|
| | 0.2680 | 0.6867 | 1.7340 |
| True | 1.4363 | 4.2261 | 7.3928 |
| Minimizing | 1.3736 | 3.4680 | 4.3660 |

Figure 6:
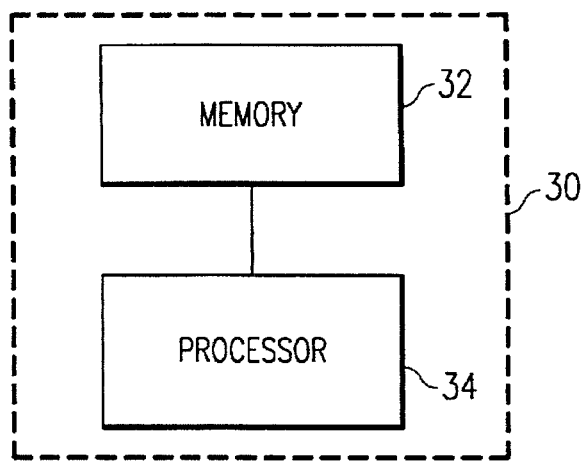
FIG. 6 shows a block diagram of a tracking sensor in accordance with the present invention.
Figure 7:
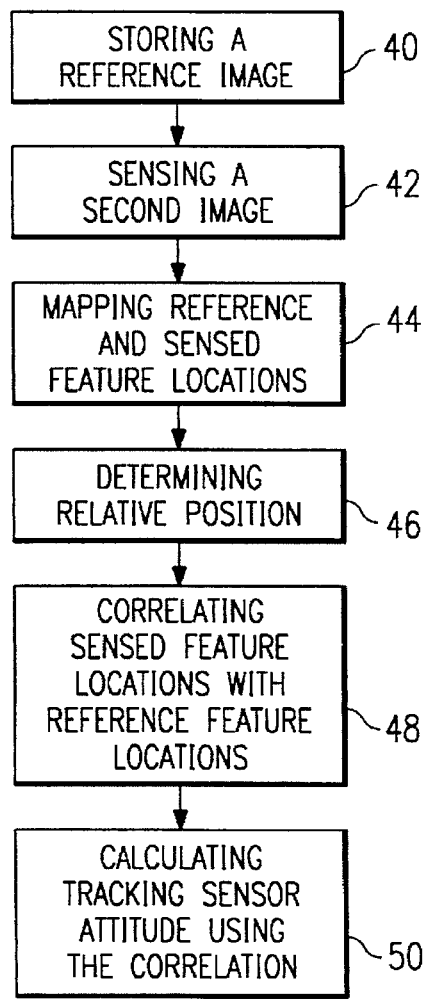
FIG. 7 is a block diagram illustrating operations of the tracking sensor in accordance with the present invention.

FIG. 6 shows a block diagram of a tracking sensor 30 in accordance with the present invention. The tracking sensor 30 includes a memory 32 and a processor 34. In accordance with the present invention, the tracking sensor 30 is operable to perform the operations shown in the flow diagram in FIG. 7. As shown in FIG. 7, those operations includes storing a reference image at block 40, sensing a second image at block 42, mapping the reference image feature locations and the sensed image feature locations at block 44, determining the relative position at block 46, correlating the sensed image feature locations with the reference image feature locations at block 48, and then calculating the tracking sensor 30 attitude using the correlations at block 50.

In summary, the preferred embodiment illustrates the use of image manipulation to improve the sensor pose determinations by more accurately producing sensor attitude measurements. By providing an exact, discrete time formulation of the attitude determination problem, the preferred embodiment enhances methods of passive ranging.

Although the present invention and its advantages have been described in detail, it should be understood that various changes, substitutions and alterations can be made herein without departing from the spirit and scope of the invention as defined by the appended claims.

What is claimed is:

1. A method of determining attitude of a tracking sensor, said tracking sensor including a memory, comprising the steps of:

storing at a first time a reference image in said memory of said tracking sensor, said reference image including a plurality of reference feature locations;

sensing at a second time first image using said tracking sensor, said first image including a plurality of sensed feature locations;

mapping said reference feature locations and said sensed feature locations from a world coordinate system to a canonical coordinate system using a 3-by-3 rotational matrix, S, said world coordinate system having a center of focus, p, in accordance with the equation:

$$x'=S(x-p)$$

where x' is a 3-vector in said world coordinate system, x is a 3-vector in said canonical coordinate system;

determining relative position of said tracking sensor between said second time and said first time;

correlating each of said sensed feature locations with each of said reference feature locations in said canonical coordinate system as a function of said relative position; and calculating said tracking sensor attitude as a function of said correlation to provide signals representing said tracking sensor attitude.

2. The method of claim 1 wherein said storing step comprises the step of storing data from a correlation template of the reference image at said first time.

3. The method of claim 1, wherein said correlation forming step comprises the step of applying discrete time formulation relationship between said reference image and said second image.

4. The method of claim 1, wherein said images comprise Forward Looking Infrared images.

5. The method of claim 1, wherein said images comprises air-to-ground RF emitter location images.

* * * * *